United States Patent
Griniasty

(10) Patent No.: US 8,645,808 B1
(45) Date of Patent: *Feb. 4, 2014

(54) CALCULATION OF SOFT DECODING METRICS

(71) Applicant: Marvell International Ltd., Hamilton (BM)

(72) Inventor: Meir Griniasty, Kfar Saba (IL)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/662,485

(22) Filed: Oct. 28, 2012

Related U.S. Application Data

(63) Continuation of application No. 12/612,692, filed on Nov. 5, 2009, now Pat. No. 8,301,989.

(60) Provisional application No. 61/117,635, filed on Nov. 25, 2008.

(51) Int. Cl.
*G06F 11/00* (2006.01)

(52) U.S. Cl.
USPC .............................. 714/786; 714/794; 714/796

(58) Field of Classification Search
USPC .......................................... 714/786, 794, 796
See application file for complete search history.

(56) References Cited

U.S. PATENT DOCUMENTS

| | | | |
|---|---|---|---|
| 6,977,972 B1 | 12/2005 | Kandala et al. | |
| 6,980,602 B1 | 12/2005 | Kleinerman et al. | |
| 7,466,658 B2 | 12/2008 | Cedergren et al. | |
| 7,480,342 B2 | 1/2009 | Wilhelmsson et al. | |
| 7,978,793 B2 | 7/2011 | Anekoji | |
| 8,270,543 B1 | 9/2012 | Fattal et al. | |
| 8,301,989 B1 | 10/2012 | Griniasty | |
| 2004/0181744 A1 | 9/2004 | Sindhushayana | |
| 2005/0025076 A1 | 2/2005 | Chaudhuri et al. | |
| 2006/0227903 A1 | 10/2006 | Niu et al. | |
| 2009/0060078 A1 | 3/2009 | Van Zelst et al. | |

OTHER PUBLICATIONS

U.S. Appl. No. 12/612,692 Ex Parte Quayle Action dated Jun. 4, 2012.
3GPP TS 25.101 "Technical Specification Group Radio Access Network; User Equipment (UE) Radio Transmission and Reception (FDD)", Release 8, version 8.5.1, Jan. 2009.
U.S. Appl. No. 12/780,903 Official Action dated Mar. 23, 2012.
3GPP TS 36.211 "Technical Specification Group Radio Access Network; Evolved Universal Terrestrial Radio Access (E-UTRA); Physical Channels and Modulation", Release 8, version 8.6.0, Mar. 2009.
U.S. Appl. No. 13/572,703, filed Aug. 13, 2012.
U.S. Appl. No. 13/572,703 Office Action dated Feb. 8, 2013.

*Primary Examiner* — Marc Duncan

(57) ABSTRACT

A method for communication includes receiving at a receiver a signal from a transmitter embodying data encoded with an error correction code. The signal is processed in order to extract a sequence of samples in a complex signal space. Scalar values are extracted from the samples and the scalar values are processed so as to define one or more clusters of scalar data points. Gain and noise of the signal are estimated responsively to the defined clusters. Bit value metrics for the signal are computed based on the samples and the estimated gain and noise of the signal. The error correction code is decoded using the bit value metrics.

22 Claims, 3 Drawing Sheets

CALCULATION OF SOFT DECODING METRICS

CROSS-REFERENCE TO RELATED APPLICATIONS

This application is a continuation of U.S. patent application Ser. No. 12/612,692, filed Nov. 5, 2009, which claims the benefit of U.S. Provisional Patent Application 61/117,635, filed Nov. 25, 2008. The disclosures of these related applications are incorporated herein by reference.

FIELD OF THE INVENTION

The present disclosure relates generally to communication systems, and particularly to methods and systems for calculating soft decoding metrics in communication receivers.

BACKGROUND

In many communication systems, a transmitter encodes data for transmission with an Error Correction Code (ECC) and transmits a signal embodying the encoded data to a receiver. The receiver receives the signal, decodes the ECC and extracts the data. Some ECC decoders decode the ECC using soft decoding metrics, such as Log Likelihood Ratios (LLRs), which are computed over the received signal.

SUMMARY

An embodiment of the present disclosure provides a method for communication. The method includes receiving at a receiver a signal from a transmitter embodying data encoded with an error correction code. The signal is processed in order to extract a sequence of samples in a complex signal space. Scalar values are extracted from the samples and the scalar values are processed so as to define one or more clusters of scalar data points. Gain and noise of the signal are estimated responsively to the defined clusters. Bit value metrics for the signal are computed based on the samples and the estimated gain and noise of the signal. The error correction code is decoded using the bit value metrics.

In some embodiments, extracting the scalar values includes projecting the samples onto an axis in the complex constellation space, so as to form the clusters on the axis. In an embodiment, processing the scalar values includes taking an absolute value of the scalar values in order to generate the scalar data points. In another embodiment, the signal includes symbols in a Quadrature Amplitude Modulation (QAM) constellation having a predetermined degree, and extracting the scalar values includes forming a number of the clusters that is a function of the degree.

In some embodiments, estimating the gain and noise includes applying a mean square fit to the clusters with the gain as a variable parameter. In a disclosed embodiment, the signal includes a Code Division Multiple Access (CDMA) signal, and processing the signal includes de-spreading the signal. In some embodiment, the bit value metrics include Log Likelihood Ratios (LLRs), and decoding the signal includes applying a Turbo decoder to the LLRs. In an embodiment, the signal is received during two or more symbol intervals, and estimating the gain and noise includes estimating the gain during one or more of the symbol intervals, and estimating the noise during another symbol interval based on the estimated gain during the one or more symbol intervals.

There is additionally provided, in accordance with an embodiment of the present disclosure, a receiver that includes a front end and signal processing circuitry. The front end is configured to receive and digitize a signal from a transmitter embodying data encoded with an error correction code. The signal processing circuitry is configured to process the signal in order to extract a sequence of samples in a complex signal space, to extract scalar values from the samples, to process the scalar values so as to define one or more clusters of scalar data points, to estimate a gain and noise of the signal responsively to the defined clusters, to compute bit value metrics for the signal based on the samples and the estimated gain and noise of the signal, and to decode the error correction code using the bit value metrics.

In some embodiments, a mobile communication terminal includes the receiver and an antenna for receiving the signal. In some embodiments, the receiver is included in a chipset for processing signals in a mobile communication terminal.

The present disclosure will be more fully understood from the following detailed description, taken together with the drawings in which:

DETAILED DESCRIPTION OF EMBODIMENTS

Figure 1:
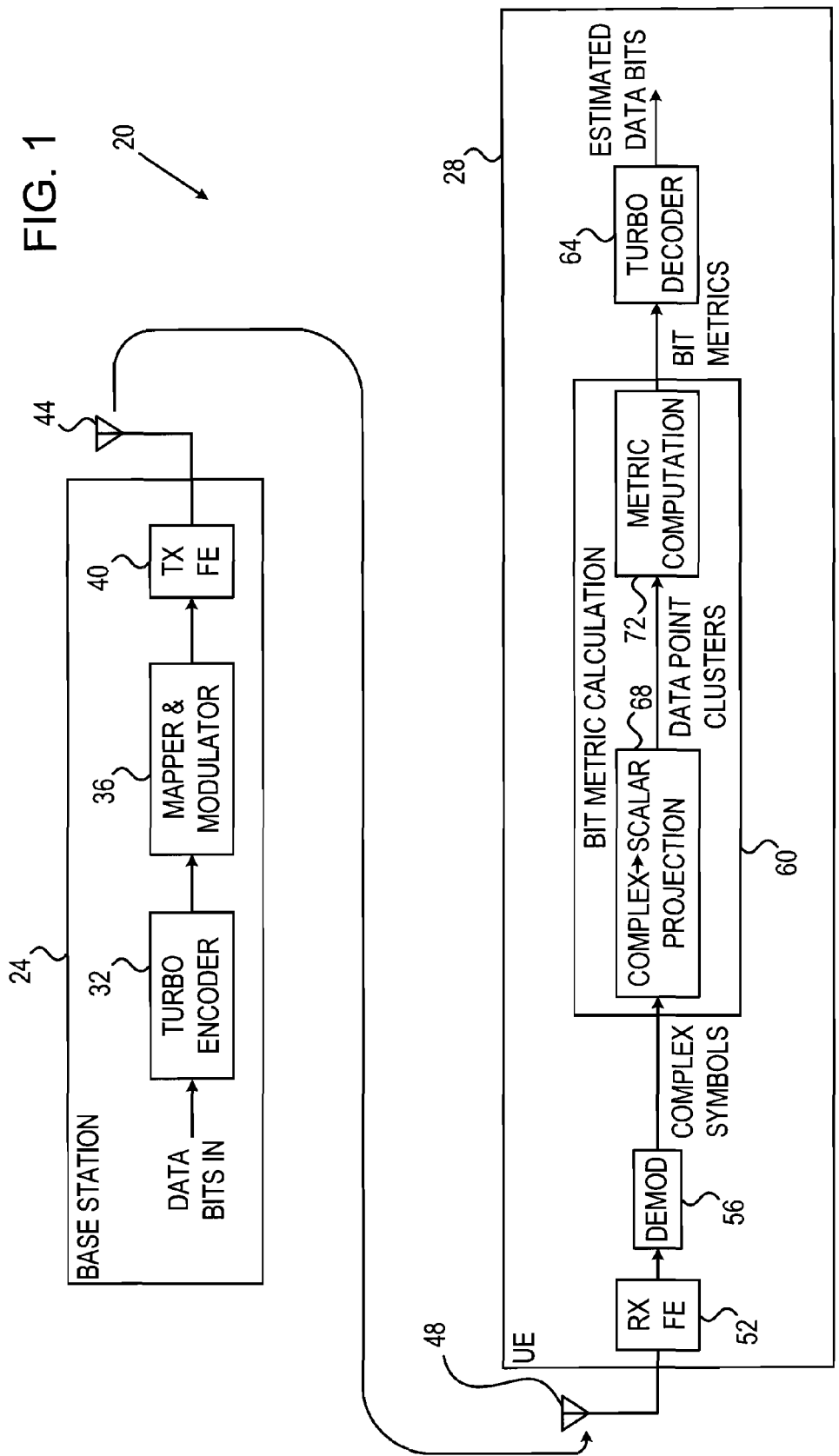
FIG. 1 is a block diagram that schematically illustrates a communication system, in accordance with an embodiment of the present disclosure.

Many communication systems encode data with an Error Correction Code (ECC) in order to mitigate noise, interference and other impairments that may cause errors in data reconstruction. In a typical communication system, a transmitter encodes the data with an ECC, modulates the encoded data to produce a communication signal and transmits the signal to a receiver. The receiver demodulates the received signal, decodes the ECC and reproduces the data from the decoded ECC. Some receivers apply soft decoding schemes, which decode the ECC using soft decoding metrics that are computed over the received signal. Typically, the soft decoding metric of a certain received bit is indicative of the likelihood that the transmitted value of this bit was "0" or "1". As such, soft decoding metrics are sometimes referred to as bit value metrics. Log Likelihood Ratios (LLRs) are an example of a type of bit value metric that can be used for ECC decoding.

Embodiments of the present disclosure that are described hereinbelow provide improved methods and systems for calculating soft decoding metrics. For example, in accordance with an embodiment, soft decoding metrics are calculated using the estimated gain and noise of a received signal.

In some embodiments, a receiver receives a signal that carries data encoded with an ECC. The signal comprises a sequence of complex symbols. Each symbol is selected from a predefined two-dimensional signal constellation in the In-phase/Quadrature (I/Q) signal space, and represents one or more bits of the encoded data. The receiver processes the received signal so as to reconstruct the sequence of complex symbols.

Each received complex symbol (also referred to as a complex sample) is represented by a two-dimensional coordinate in the I/Q space. The sequence of complex samples thus forms a set of complex clusters in the I/Q space, each complex cluster corresponding to one of the constellation symbols.

In order to estimate the gain and noise of the signal, the receiver converts the complex samples into scalar values, for example by projecting the complex samples onto a scalar axis in the I/Q space or using any other suitable technique. Since the complex samples lie in multiple complex clusters in the I/Q space, the complex-to-scalar conversion (e.g., projection) tends to form one or more clusters of scalar data points. The receiver estimates the gain and noise of the received complex samples based on the statistical properties of the scalar data point clusters, and then calculates the soft decoding metrics using the estimated gain and noise. The receiver decodes the ECC using the soft decoding metrics, so as to reproduce the transmitted data bits with high probability.

In summary, the methods and systems described herein estimate the gain and noise of the received samples by performing direct measurements on the two-dimensional signal-space coordinates of the samples. The gain and noise estimates are then used for calculating soft ECC decoding metrics. Unlike some known methods that measure gain or noise over known pilot signals, the methods and systems described herein estimate the gain and noise over the actual received data. As a result, the disclosed methods are insensitive to gain or noise differences between the pilot signals and the actual data, and are therefore highly accurate in computing soft decoding metrics. Moreover, since the number of data symbols is usually much greater than the number of pilot symbols, the disclosed methods can estimate the gain and noise with high accuracy. At the same time, these methods are computationally simple and efficient.

FIG. 1 is a block diagram that schematically illustrates a communication system 20, in accordance with an embodiment of the present disclosure. System 20 comprises a transmitter, which transmits signals to a receiver. In the present example, the transmitter comprises a Base Station (BS) 24 in a cellular communication network, and the receiver comprises a User Equipment (UE) 28, i.e., a mobile communication terminal. Alternatively, system 20 may comprise any other suitable type of transmitter and receiver. Although real-life systems often comprise a large number of transmitters and receivers, FIG. 1 shows only a single transmitter and a single receiver for the sake of clarity.

System 20 may be used in a variety of applications and it may conform to any suitable communication standard or protocol. In the present example, system 20 operates in accordance with a Wideband Code Division Multiple Access (WCDMA) specification, such as the Third Generation Partnership Project (3GPP) Universal Mobile Telecommunications System (UMTS) specifications. Alternatively, system 20 may conform to any other suitable specification or protocol that uses modulation schemes having complex symbols, such as, for example, EDGE release 7 (also referred to as General Packed Radio Service 2—EGPRS2) and Long Term Evolution (LTE) protocols.

In accordance with an embodiment of the disclosure, BS 24 encodes data for transmission with an Error Correction Code (ECC). In the present example, BS comprises a Turbo encoder 32, which applies a Turbo code to the data. Alternatively, encoder 32 may use any other suitable type of ECC, such as a Low Density Parity Check (LDPC) code, a Bose-Chaudhuri-Hocquenghem (BCH) code or a Reed-Solomon (RS) code. Encoder 32 accepts data bits as input, and produces encoded bits as output.

A mapper/modulator 36 divides the encoded bits into groups and maps each group to a complex symbol, which is selected from a predefined symbol constellation. The term "complex" means that the symbol in question can be represented by a two-dimensional coordinate in an In-phase/Quadrature (I/Q) signal space. Modulator/mapper 36 may use any suitable modulation scheme, such as Quaternary Phase Shift Keying (QPSK), Sixteen Quadrature Amplitude Modulation (16-QAM), Thirty-two Quadrature Amplitude Modulation (32-QAM) or Sixty-four Quadrature Amplitude Modulation (64-QAM). QPSK modulation has four constellation signals, each symbol representing two bits. 16-QAM has a sixteen-symbol constellation, each complex symbol representing four bits. 32-QAM has a 32-symbol constellation, each complex symbol representing five bits. 64-QAM has a 64-symbol constellation, each complex symbol representing six bits.

Modulator/mapper 36 outputs a sequence of complex symbols. (In some embodiments, e.g., in a WCDMA transmitter, the complex symbols may be multiplied by spreading and scrambling sequences before transmission.) A Transmitter Front End (TX FE) 40 converts the sequence of complex symbols to a Radio Frequency (RF) signal. Typically, TX FE 40 converts the sequence of complex symbols to an analog signal using one or more digital-to-analog converters, and applies filtering, frequency up-conversion and amplification to the analog signal. The RF signal produced by TX FE 40 is transmitted via a transmitter antenna 44 to UE 28.

UE 28 receives the RF signal using a receiver antenna 48. A Receiver Front End (RX FE) 52 receives and processes the signal. Typically, RX FE 52 applies amplification, filtering and frequency down-conversion to the signal, and then digitizes it using one or more analog-to-digital converters (not shown). A demodulator 56 processes the digitized signal, and produces a sequence of complex samples that attempts to reproduce the transmitted complex symbols. In some embodiments, e.g., in a WCDMA receiver, the demodulator performs channel estimation followed by chip equalization, e.g., by a rake receiver, and then de-scrambling and de-spreading.

UE 28 comprises a bit metric calculation unit 60, which calculates soft decoding metrics (also referred to as bit value metrics) based on the received complex samples. In the example of FIG. 1, unit 60 comprises a complex-to-scalar projection module 68 and a metric computation module 72. Module 68 projects the complex samples onto an axis in the I/Q space, thus converting the complex samples into scalar data points. Module 72 calculates the soft decoding metrics using these scalar data points, typically based on the actual value of each symbol and estimates of gain and noise. The functionality of unit 60 is described in greater detail below.

In the present example, the soft decoding metrics comprise Log Likelihood Ratios (LLRs). The LLR of a given received bit indicates the likelihood that the transmitted value of this bit was "0" or "1". In alternative embodiments, unit 60 may calculate any other suitable type of soft decoding metrics. A Turbo decoder 64 decodes the ECC using the soft decoding metrics calculated by unit 60. The Turbo decoder outputs decoded bits, which estimate the data bits that were transmitted by BS 24.

The system configuration shown in FIG. 1 is an example configuration, which is chosen for the sake of conceptual clarity. In alternative embodiments, any other suitable system, BS and/or UE configuration can also be used. For example, in a CDMA system, the BS typically spreads the signal using a pseudo-random spreading code prior to modulation, and the UE de-spreads the signal after demodulation.

These elements are not shown in the figure for the sake of clarity. As another example, although the embodiments described herein refer to downlink transmission (i.e., transmission from the BS to the UE), the disclosed techniques can also be used in uplink transmission from the UE to the BS.

The different elements of UE 28 may be implemented using any suitable types of components. RX FE 52 may be implemented, for example, in one or more Radio Frequency Integrated Circuits (RFICs). Elements of UE 28, e.g., the receiver and in particular unit 60, may be implemented in one or more chipsets comprising Application-Specific Integrated Circuits (ASICs) or Field-Programmable Gate Arrays (FPGAs). Some UE elements may be implemented using software running on a suitable processor, or using a combination of hardware and software elements. For example, some or all of the functions of unit 60 may be carried out by a general-purpose processor, which is programmed in software to execute instructions or otherwise carry out the functions described herein. The software may be downloaded to the processor in electronic form, over a network, for example, or it may, alternatively or additionally, be provided and/or stored on tangible media, such as magnetic, optical, or electronic memory.

Figure 2:
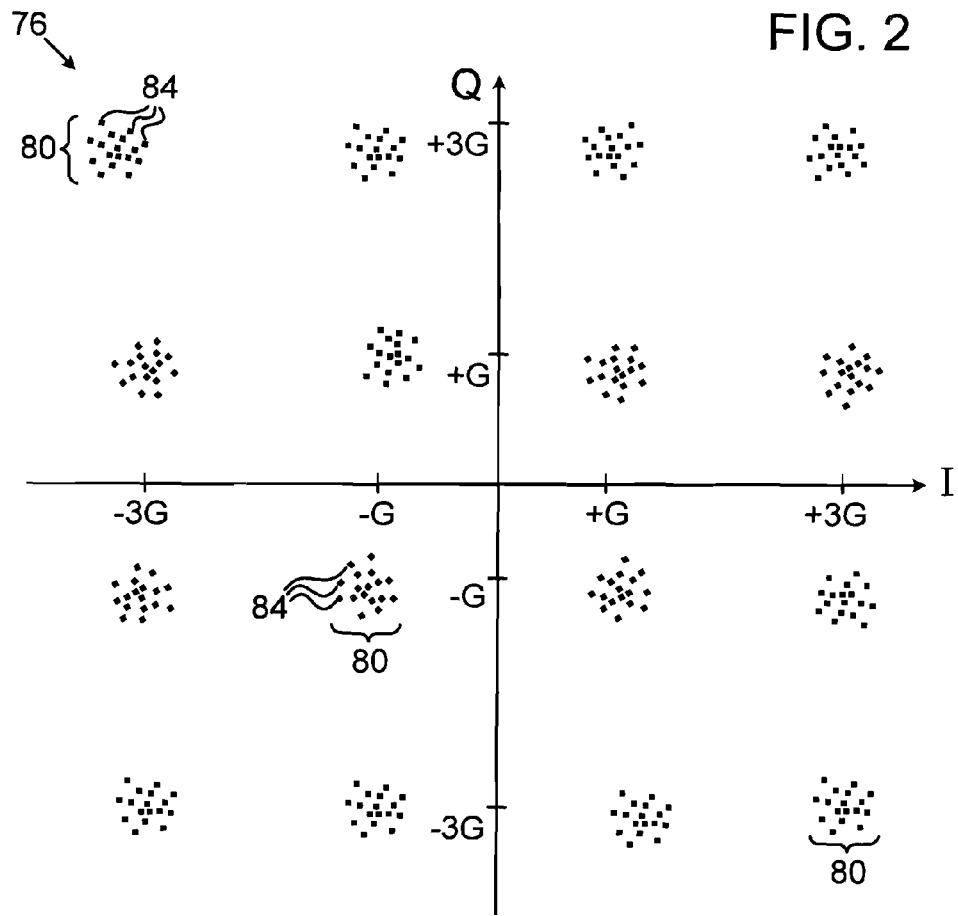
FIG. 2 is a diagram showing received complex samples in a two-dimensional signal space, in accordance with an embodiment of the present disclosure.

FIG. 2 is a diagram showing received complex samples in a two-dimensional signal space 76, in accordance with an embodiment of the present disclosure. The example of FIG. 2 shows complex samples of a received 16-QAM signal, which are provided as input to unit 60 in UE 28 of FIG. 1. (When considering CDMA systems, the description that follows refers to the signal after it is de-spread by the receiver, for example the UE.)

Each complex sample is represented by a signal point 84 in the I/Q space. As can be seen in the figure, the complex samples generally fall in sixteen complex clusters 80 in the I/Q space. Each complex cluster corresponds to a respective 16-QAM constellation signal. In other words, the complex samples in each cluster are likely to represent a particular combination of four bits. (The example of FIG. 2 refers to 16-QAM. When using QPSK, the complex samples at the receiver generally fall in four complex clusters. When using 64-QAM, the complex samples at the receiver tend to fall in sixty-four complex clusters.)

The complex clusters in FIG. 2 lie on a grid, whose I coordinates are $\{-3G, -G, G, 3G\}$ and Q coordinates are $\{-3G, -G, G, 3G\}$. The term G is indicative of the gain of the received signal, and is generally unknown a-priori to the receiver. (In QPSK, the complex clusters would lie on a grid whose I coordinates are $\{-G, G\}$ and Q coordinates are $\{-G, G\}$. In 64-QAM, the complex clusters would lie on a grid whose I coordinates are $\{\pm 7G, \pm 5G, \pm 3G \text{ and } \pm G\}$ and Q coordinates are $\{\pm 7G, \pm 5G, \pm 3G \text{ and } \pm G\}$.

In addition, the scattering or variance of complex samples within each complex cluster is indicative of the noise level of the signal. A low-noise signal is typically characterized by relatively small and dense complex clusters in the I/Q space. A noisy signal, on the other hand, is typically characterized by relatively large and scattered complex clusters.

Typically, the soft decoding metrics (e.g., LLRS) depend on the gain and noise of the signal. In some embodiments, unit 60 in UE 28 estimates the gain and noise of the signal by processing the received complex samples, and calculates the soft decoding metrics based on the estimated gain and noise.

Consider, for example, complex samples of a received QPSK signal. In this example, each complex sample represents two received bits, one bit associated with the I coordinate (dimension) of the sample and the other bit with the Q coordinate. For a given complex sample, the LLR of the first bit is given by:

$$LLR = \log\frac{prob(\text{bit} = 1|x)}{prob(\text{bit} = -1|x)} \qquad \text{Equation 1}$$
$$= -(x-g)^2/2\sigma^2 + (x+g)^2/2\sigma^2$$
$$= 2xg/\sigma^2$$

In Equation 1, g denotes the amplitude (absolute value) of the complex sample, $\sigma^2$ denotes the noise power in the I dimension, and x denotes the measured amplitude of the I component of the complex sample. The LLR of the second bit can be expressed similarly in terms of the Q component of the complex sample, denoted y. In the present example, the gain in the I and Q dimensions is assumed to be the same, and so is the noise power. Equation 1 above shows an example of a soft decoding metric that depends on the gain and noise of the received signal. Similar relationships can be developed for various other modulation schemes and metrics.

In order to estimate the gain and noise of the signal, in accordance with an embodiment, module 68 in unit 60 projects complex samples 84 onto an axis of the I/Q space. In other words, module 68 converts one complex sample to two scalar data points. This projection operation converts the two-dimensional (complex) distribution of I and Q sample values into a one-dimensional (scalar) distribution.

Note that the gain and noise of the signal may be estimated in any other suitable manner. The term "projection" used herein, and the projection operations illustrated in the figures, are provided to enable a conceptual understanding of a method for estimating gain and noise. Alternatively, however, any other method that extracts scalar values from complex samples can also be used to estimate the gain and noise of the received signal. Such methods may or may not perform projection from a two-dimensional space onto a one-dimensional axis.

Figure 3:
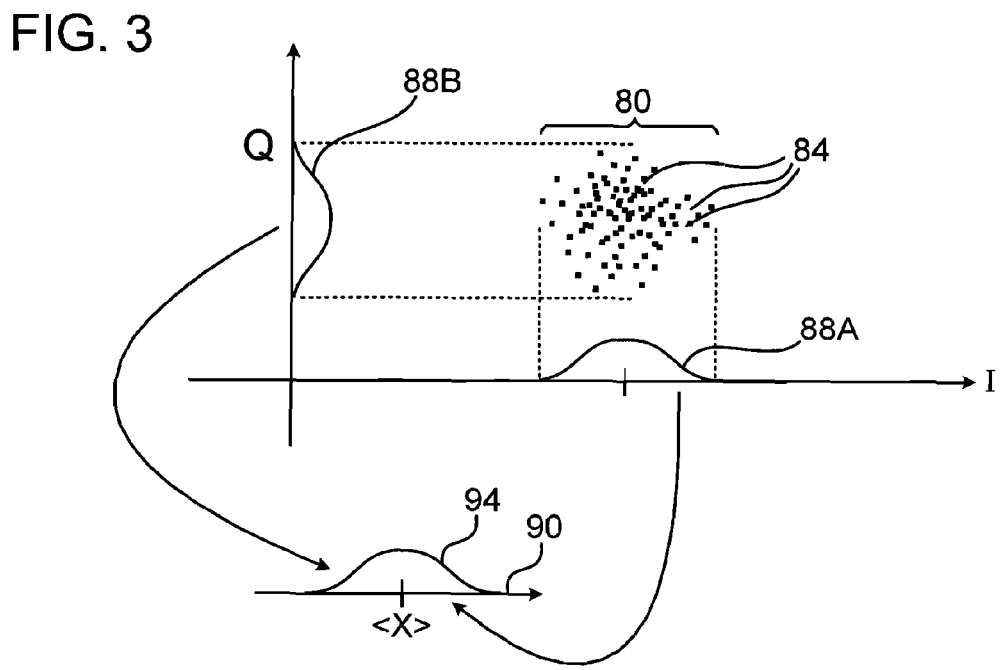
FIG. 3 is a diagram showing a cluster of complex samples projected onto a scalar axis, in accordance with an embodiment of the present disclosure.

FIG. 3 is a diagram showing an example of a cluster of complex samples projected onto a scalar axis, in accordance with an embodiment of the present disclosure. In the example of FIG. 3, a complex cluster in the I/Q space comprises multiple complex samples 84. The I-dimension components of the samples in cluster 80 are distributed in accordance with a distribution 88A. The Q-dimension components of the samples in the cluster are distributed in accordance with a distribution 88B.

Module 68 projects complex samples 84 onto a scalar axis 90. The projection produces a one-dimensional (scalar) cluster of scalar data points, which are distributed according to a distribution 94. Module 68 forms the scalar cluster by aggregating the I-dimension and Q-dimension components of the complex samples onto the same scalar axis. In other words, the projection operation superimposes distributions 88A and 88B to produce distribution 94. The mean of distribution 94 is denoted <x>, and is indicative of the gain G. The variance or standard deviation of distribution 94 is indicative of the noise level of the signal. In summary, unit 60 can estimate the gain and noise by projecting a complex cluster onto a scalar axis, and processing the scalar values of the resulting scalar distribution.

FIG. 3 shows only a single complex cluster for the sake of clarity. In this simplified case, the projection produces scalar data points that lie in a single scalar cluster on the axis. Typically, however, module 68 projects multiple complex clusters (typically all clusters) onto the axis. Thus, the projection operation produces scalar data points that lie in multiple scalar clusters on the axis. Each scalar cluster has a respective distribution similar to distribution 94. Module 72 of unit 60 processes the scalar values in the multiple scalar clusters, so as to estimate the gain and noise of the signal.

For example, when the complex clusters are positioned symmetrically with respect to the I and Q axes, module 72 may take the absolute value of the I and Q coordinates of the complex samples. This may be performed, for example, when projecting complex samples onto the axis. This operation reduces the number of scalar clusters, effectively folding the I/Q space into a single quadrant.

The number of constellation signals in a given modulation scheme is referred to as the degree of the modulation scheme. Generally, the number of scalar clusters depends on the degree of the modulation scheme in question.

In an embodiment, module 72 uses various methods for estimating the gain and noise of the signal based on the projected scalar values. In the description that follows, the projected scalar values are denoted x, absolute value is denoted | |, and statistical mean is denoted < >.

In some embodiments, module 72 estimates the gain (denoted $G_0$) and noise (denoted N) of the signal using the following formulas, for different modulation schemes:

TABLE 1

Gain and noise estimates based on projected scalar values for different modulation schemes

| Modulation | $G_0$ estimate | N estimate |
|---|---|---|
| QPSK | $<\|x\|>$ | $<x^2>-G^2$ |
| 16-QAM | $<\|x\|>/2$ | $<x^2>-5G^2$ |
| 64-QAM | $<\|x\|>/4$ | $<x^2>-21G^2$ |

The gain and noise estimates given above assume that each complex cluster has approximately the same number of complex samples, and disregards complex samples that fall on the wrong side of the I or Q axis.

In some embodiments, module 72 refines the estimation of Table 1 above using means square fitting. Consider, for example, the following cost function for 64-QAM modulation:

$$F(G) = \sum_{i, abs(x_i)<2G_0} (x_i - G)^2 + \sum_{i, 2G_0<abs(x_i)<4G_0} (x_i - 3G)^2 + \sum_{i, 4G_0<abs(x_i)<6G_0} (x_i - 5G)^2 + \sum_{i, abs(x_i)>6G_0} (x_i - 7G)^2 \quad \text{Equation 2}$$

In Equation 2, the gain G is a variable parameter. Each term sums over the scalar values $x_i$ in a respective scalar cluster, after projection. $G_0$ denotes the gain estimate calculated according to the formula in Table 1 above. An improved estimate of the gain (denoted $G_1$) can be evaluated by calculating the derivative of F(G) with respect to G, and finding the value of G for which the derivative is zero. $G_1$ is thus given by:

$$G_1 * \left[ \sum_{i, x_i \in cluster1} 1 + \sum_{i, x_i \in cluster2} 9 + \sum_{i, x_i \in cluster3} 25 + \sum_{i, x_i cluster4} 49 \right] = \quad \text{Equation 3}$$

-continued
$$\sum_{i, x_i \in cluster1} x_i + \sum_{i, x_i \in cluster2} 3x_i + \sum_{i, x_i \in cluster3} 5x_i + \sum_{i, x_i \in cluster4} 7x_i$$

wherein each term sums over one of the scalar clusters.

In accordance with an embodiment, module 72 estimates the noise variance $\sigma^2$ by:

$$\sigma^2 = \left[ \sum_{i, abs(x_i)<2G_0} (x_i - G_0)^2 + \sum_{i, 2G_0<abs(x_i)<4G_0} (x_i - 3G_0)^2 + \sum_{i, 4G_0<abs(x_i)<6G_0} (x_i - 5G_0)^2 + \sum_{i, abs(x_i)>6G_0} (x_i - 7G_0)^2 \right] / M \quad \text{Equation 4}$$

wherein M denotes the total number of scalar values (scalar data points).

In some embodiments, the computation of Equations 3 and 4 above can be repeated iteratively, in order to further refine the gain and noise estimation. For example, the value of $G_1$, which was calculated in Equation 3 above, can be substituted into the equations instead of $G_0$, and the computation repeated. Module 72 may perform two or more such iterations. In many practical scenarios, two iterations are sufficient for accurate estimation of gain and noise.

In yet another embodiment, module 72 may compute Equations 3 and 4 (once or iteratively) without performing the initial computation of Table 1 above. In other words, the process of Equations 3 and 4 can be started with any other suitable initial estimate of the gain and/or noise of the received signal. In still another embodiment, module 72 may perform only the rough calculation of Table 1, without the refined computation of Equations 3 and 4.

Equations 2-4 above demonstrate a means square fitting process for 64-QAM modulation. Similar formulas can be defined following the same principles, mutatis mutandis, for other modulation schemes. Further additionally or alternatively, module 72 may use any other method for estimating the gain and noise of the signal using the projected scalar data points. After estimating the gain and noise, module 72 calculates the soft decoding metrics (e.g., LLRs) using these estimates.

Figure 4:
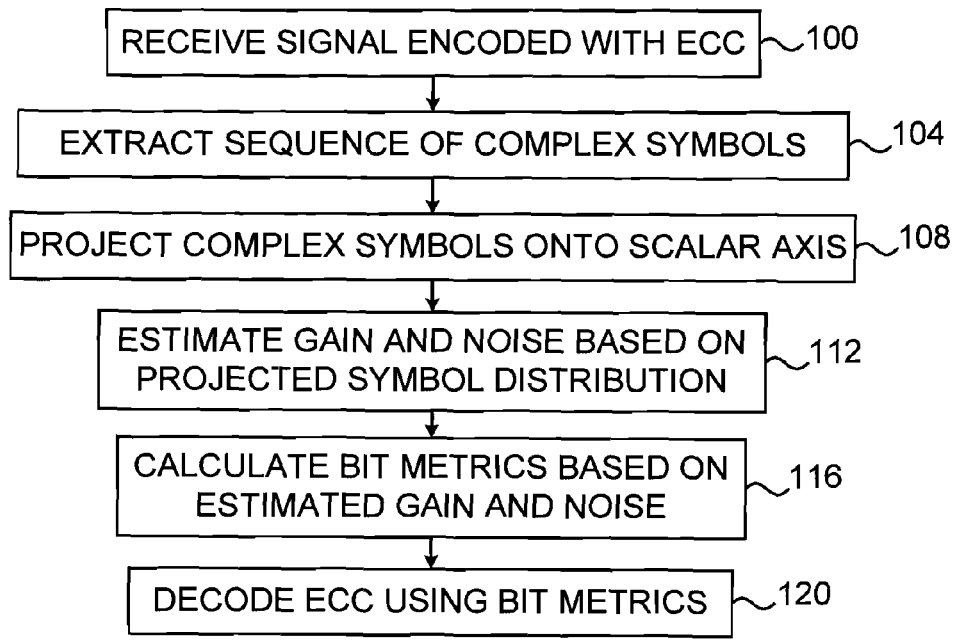
FIGS. 4 and 5 are flow charts that schematically illustrate methods for communication, in accordance with embodiments of the present disclosure.

FIG. 4 is a flow chart that schematically illustrates a method for communication, in accordance with an embodiment of the present disclosure. The method begins at a reception operation 100, with RX FE 52 in UE 28 receiving a signal that embodies data encoded with an ECC. At a sample extraction operation 104, demodulator 56 in the UE extracts a sequence of complex symbols (complex samples) from the received signal. At a projection operation 108 in accordance with an embodiment, module 68 in unit 60 of the UE projects the complex samples onto a scalar axis in the I/Q space. The projection operation produces one or more clusters of scalar values. (As noted above, module 68 may extract the scalar values from the complex samples using any other suitable method, not necessarily involving projection.)

At an estimation operation 112, module 72 in unit 60 estimates the gain and noise of the received signal, e.g., using the methods described above. At a metric calculation operation 116, module 72 calculates soft decoding metrics (bit value metrics, such as LLRs) for the received bits based on the estimated gain and noise. At a decoding operation 120, Turbo decoder 64 decodes the ECC using the soft decoding metrics produced by module 72.

In some embodiments, unit 60 estimates the noise of a given signal using gain estimates performed on another signal. This technique can be used, for example, when decoding pilot signals in WCDMA systems. In an example WCDMA system configuration, a downlink slot comprises 2560 chips. (A chip denotes a symbol of the high-bandwidth spreading code, before de-spreading.) Each slot comprises ten symbol intervals, each comprising 256 chips. In each symbol interval, a pilot signal is transmitted concurrently with one or more data symbols. The pilot signals transmitted in the ten symbol intervals of the slot are denoted $P_0 \ldots P_9$, respectively. The pilot signals are used by the UE, for example, for estimating the channel properties prior to demodulation of the slot data.

In some practical cases, the first symbol interval in the slot (in which the first pilot signal, $P_0$, is received) has a higher noise level in comparison with the other symbol intervals. In the present example, an additional synchronization channel is transmitted in the first symbol interval, concurrently with pilot symbol $P_0$. This synchronization channel is not present during the other symbol intervals. Therefore, the first symbol interval is typically received with a considerably higher noise level than the subsequent nine symbol intervals. Gain and noise estimation during this noisy symbol interval is likely to be inaccurate due to the high noise level.

In some embodiments, unit 60 in the UE reduces the impact of the high noise level by estimating the noise in the first symbol interval using gain estimates computed over the subsequent symbol intervals. The gain of $P_0$ is assumed to be the same as the gain of $P_1 \ldots P_9$.

Figure 5:
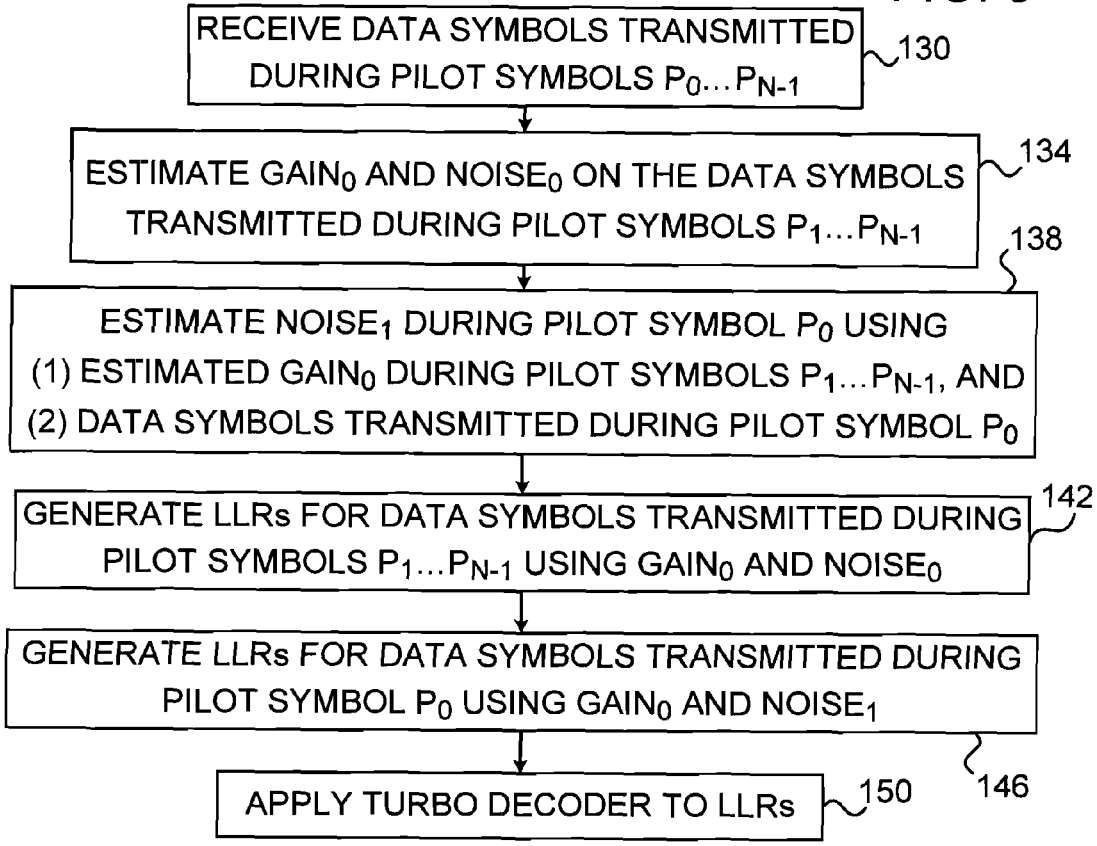

FIG. 5 is a flow chart that schematically illustrates a method for communication, in accordance with an embodiment of the present disclosure. The method begins at a slot reception operation 130, with UE 28 receiving a downlink slot having N symbol intervals comprising N pilot signals $P_0 \ldots P_{N-1}$, respectively. Each symbol interval comprises one or more data symbols that are transmitted concurrently with the pilot signal.

At a gain/noise estimation operation 134, unit 60 estimates the gain and noise in the data symbols that are received during the symbol intervals of pilot signals $P_1 \ldots P_{N-1}$ (i.e., over all but the first symbol interval). The gain and noise estimated at this stage are denoted $GAIN_0$ and $NOISE_0$, and unit 60 can estimate them, for example, using the method of FIG. 4 above.

At a noise estimation operation 138, unit estimates the noise in the data symbols that are transmitted during the first symbol interval, i.e., concurrently with pilot signal $P_0$. As noted above, this symbol interval is typically noisier than the other symbol intervals due to the synchronization channel transmitted in it. Therefore, unit 60 estimates the noise during the first symbol interval separately. Since the signal statistics during the first symbol interval may be limited, unit 60 estimates the noise in the data symbols of the first symbol interval based on gain estimates from the other symbol intervals. In other words, unit 60 estimates the noise in the data symbols of the first symbol interval (denoted $NOISE_1$) based on (1) $GAIN_0$ estimated at operation 134 above, and (2) the data symbols transmitted in the first symbol interval.

At a first LLR generation operation 142, unit 72 generates LLRs for the bits of the data symbols received during the symbol intervals of $P_1 \ldots P_{N-1}$, based on the $GAIN_0$ and $NOISE_0$ estimates. At a second LLR generation operation 146, unit 72 generates LLRs for the bits of the data symbols received during the first symbol interval (the symbol interval of $P_0$) based on the $GAIN_0$ and $NOISE_1$ estimates. The LLRs generated at operations 142 and 164 are provided to Turbo decoder 64. At a decoding operation 150, the Turbo decoder decodes the ECC using the LLRs, so as to estimate the transmitted data bits.

Although the embodiments described herein mainly address gain and noise estimation for computation of soft decoding metrics, the methods and systems described herein are also suitable for use in other applications that involve gain and/or noise estimation.

It will thus be appreciated that the embodiments described above are cited by way of example, and that the presently claimed invention is not limited to what has been particularly shown and described hereinabove. Rather, the scope of the presently claimed invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for communication, comprising:
    receiving at a receiver a signal embodying data from a transmitter;
    extracting from the signal a sequence of complex samples, and producing scalar values from the complex samples;
    estimating a gain and noise of the signal responsively to a statistical property of the scalar values;
    computing bit value metrics for the signal based on the samples and the estimated gain and noise of the signal; and
    recovering the data using the bit value metrics.

2. The method according to claim 1, wherein recovering the data comprises decoding an error correction code, with which the data is encoded, using the bit value metrics.

3. The method according to claim 1, wherein recovering the data comprises decoding an error correction code with which the data is encoded, by applying a Turbo decoder to the bit value metrics.

4. The method according to claim 1, wherein the signal comprises a Code Division Multiple Access (CDMA) signal, and comprising de-spreading the CDMA signal and then extracting the samples from the de-spread signal.

5. The method according to claim 1, wherein producing the scalar values comprises projecting the complex samples onto a single axis.

6. The method according to claim 1, wherein estimating the gain and noise comprises processing the scalar values so as to define one or more clusters of scalar data points, and estimating the gain and noise responsively to the defined clusters.

7. The method according to claim 6, wherein processing the scalar values comprises taking an absolute value of the scalar values in order to generate the scalar data points.

8. The method according to claim 6, wherein the signal comprises symbols in a Quadrature Amplitude Modulation (QAM) constellation having a predetermined degree, and wherein processing the scalar values comprises forming a number of the clusters that is a function of the degree.

9. The method according to claim 6, wherein estimating the gain and noise comprises applying a mean square fit to the clusters with the gain as a variable parameter.

10. The method according to claim 1, wherein the signal is received during two or more symbol intervals, and wherein estimating the gain and noise comprises estimating the gain during one or more of the symbol intervals, and estimating the noise during another symbol interval based on the estimated gain during the one or more symbol intervals.

11. A receiver, comprising:
a front end, which is configured to receive a signal embodying data from a transmitter; and
signal processing circuitry, which is configured to extract from the signal a sequence of complex samples, to produce scalar values from the complex samples, to estimate a gain and noise of the signal responsively to a statistical property of the scalar values, to compute bit value metrics for the signal based on the samples and the estimated gain and noise of the signal, and to recover the data using the bit value metrics.

12. The receiver according to claim 11, wherein the signal processing circuitry is configured to recover the data by decoding an error correction code, with which the data is encoded, using the bit value metrics.

13. The receiver according to claim 11, wherein the signal processing circuitry is configured to recover the data by decoding an error correction code with which the data is encoded, by applying a Turbo decoder to the bit value metrics.

14. The receiver according to claim 11, wherein the signal comprises a Code Division Multiple Access (CDMA) signal, and wherein the signal processing circuitry is configured to de-spread the CDMA signal and then to extract the samples from the de-spread signal.

15. The receiver according to claim 11, wherein producing the scalar values comprises projecting the complex samples onto a single axis.

16. The receiver according to claim 11, wherein the signal processing circuitry is configured to process the scalar values so as to define one or more clusters of scalar data points, and to estimate the gain and noise responsively to the defined clusters.

17. The receiver according to claim 16, wherein the signal processing circuitry is configured to take an absolute value of the scalar values in order to generate the scalar data points.

18. The receiver according to claim 16, wherein the signal comprises symbols in a Quadrature Amplitude Modulation (QAM) constellation having a predetermined degree, and wherein the signal processing circuitry is configured to form a number of the clusters that is a function of the degree.

19. The receiver according to claim 16, wherein the signal processing circuitry is configured to estimate the gain and noise by applying a mean square fit to the clusters with the gain as a variable parameter.

20. The receiver according to claim 11, wherein the front end is configured to receive the signal during two or more symbol intervals, and wherein the signal processing circuitry is configured to estimate the gain during one or more of the symbol intervals, and to estimate the noise during another symbol interval based on the estimated gain during the one or more symbol intervals.

21. A mobile communication terminal comprising the receiver of claim 11 and an antenna for receiving the signal.

22. The receiver according to claim 11, wherein the front end and the signal processing circuitry are implemented in a chipset for processing signals in a mobile communication terminal.

* * * * *